Patented Aug. 4, 1931

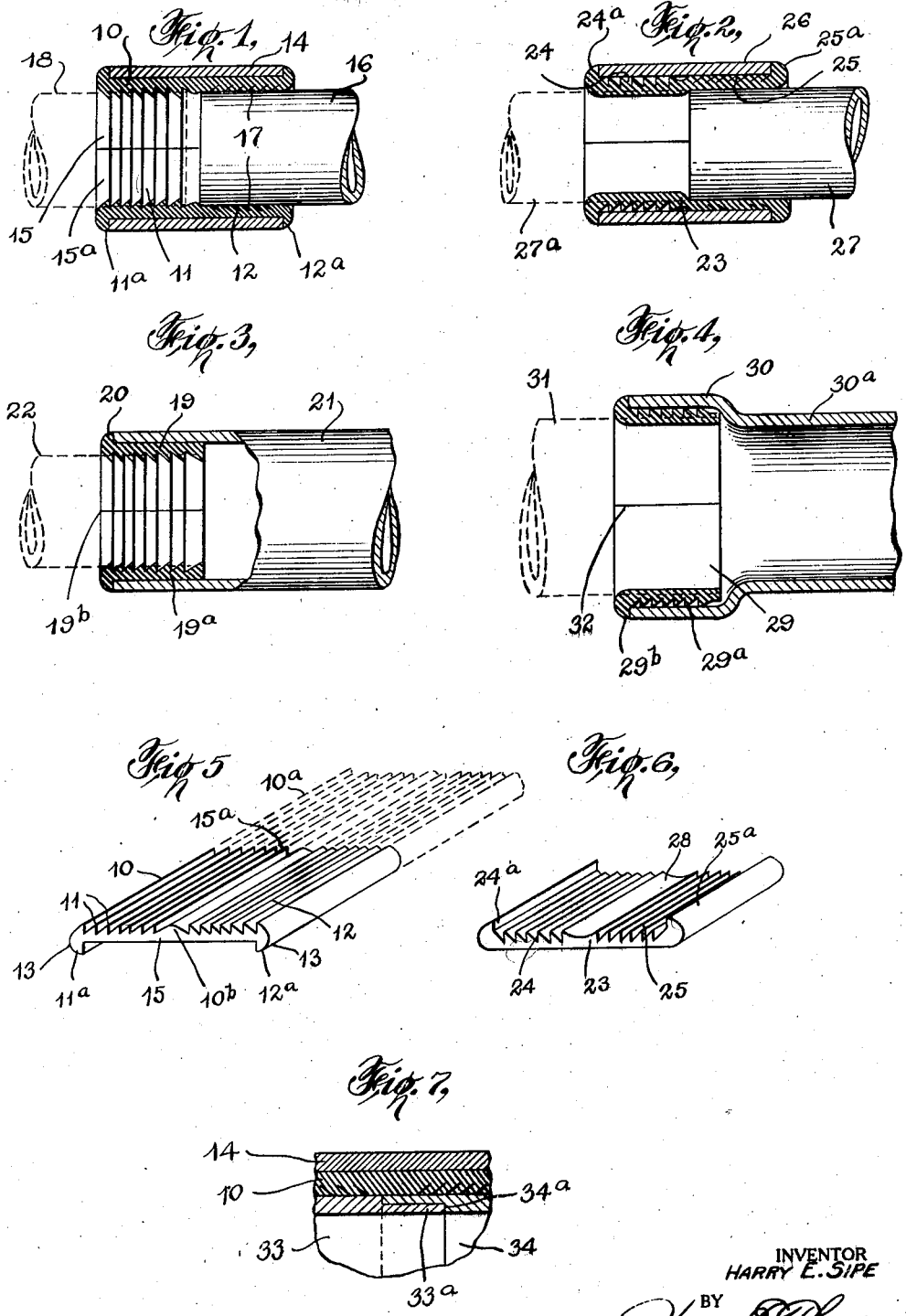

1,817,774

UNITED STATES PATENT OFFICE

HARRY E. SIPE, OF NEW YORK, N. Y.

TUBULAR COUPLING AND METHOD OF CONSTRUCTING THE SAME

Application filed May 2, 1928. Serial No. 274,390.

This invention relates to couplings employed for securing pipes, tubings, rods and the like together; and the object of the invention is to provide a coupling of the class specified employing as part of the coupling element, a body of yielding material such for example as rubber or a composition including rubber, and more particularly to an element of this class including projecting members forming corresponding recesses on one face or surface thereof, said projecting members being adapted to flex and be placed in operation in the use of the coupling to securely couple two or more bodies together; a further object being to include in conjunction with said coupling element, one or more flange portions engaging the edge wall of one member to be coupled or a coupling sleeve or tube employed in conjunction with the element; a further object being to provide a coupling element of the class described which is preferably fashioned from an elongated strip cut into the desired length and folded or coiled to form a tubular or sleeve-like body insertable into one part to be coupled or employed on the inner wall of a tubular coupling body; and with these and other objects in view, the invention consists in a coupling of the class and for the purpose specified, which is constructed and used in acordance with my improved method, and which is more fully hereinafter described and claimed.

The invention is fully disclosed in the following specification, of which the accompanying drawings form a part, in which the separate parts of my improvement are designated by suitable reference characters in each of the views, and in which:—

Fig. 1 is a cross sectional view of one form of coupling made according to my invention and indicating a method of its use.

Fig. 2 is a view similar to Fig. 1, but showing a modification.

Fig. 3 is a view similar to Fig. 1, but showing a different use of the coupling element which I employ.

Fig. 4 is a view similar to Fig. 3 but showing the structure of the coupling element as seen in Fig. 2.

Fig. 5 is a detail view of a segment or part cut from an elongated strip from which one form of my improved coupling element is formed.

Fig. 6 is a view similar to Fig. 5 but showing the other form of element which I employ; and, Fig. 7 is a sectional, detail view showing a modified structure in the pipes or tubes which are coupled.

In carrying my invention into effect, I provide either one of two types of coupling elements constructed from elastic, resilient or yieldable bodies preferably composed of rubber or composition rubber. In Fig. 5 of the drawings, I have shown at 10, one of the coupling bodies which I employ in an extended position, and have diagrammatically illustrated the method of its construction, the body 10 being severed from an elongated ribbon-like strip of material, which is cut off transversely to form the element 10 or a number of such elements 10a, representing in dotted lines, a portion of the remainder of the strip from which the element 10 is cut. One face of the element 10 is provided with two sets of longitudinally arranged rib-like members 11 and 12 disposed at opposite side portions of the element 10, each of said ribs having upper perpendicular walls and inclined or beveled walls, said inclined walls of the ribs 11 and 12 being both directed to the central portion of the element. The sides of the element are also provided with flanges 11a and 12a which extend or project at the opposite side face of said element. The outer surfaces of said flanges are preferably rounded as seen at 13.

After the element 10 has been formed in the manner seen in Fig. 5 and when it is desired to use the same as a part of a coupling, it is inserted into a coupling sleeve or tube 14 such as seen in Fig. 1, by bringing the ends 15—15a of the element together within the sleeve 14 in an abutting relation and preferably under a slight tension or compression of the walls of the element 10, the intersection and abutment of said end portions being seen at the left of Fig. 1 of the drawings. The transverse dimensions of the element 10 or the distance between the flanges 11a and 12a are such as to engage the end walls of the tube 14 as seen in Fig. 1 of the drawings, and thus prevent lateral displacement of the element 10 with reference to the coupling sleeve 14.

The coupling is now ready for use, and as seen at the right of Fig. 1 of the drawings, a pipe, bar, rod or the like 16 may be inserted into one end of the coupling. In this operation, the projecting members 12 are flexed and placed under compression, being so constructed as to form a substantially solid mass of the flexed and compressed portions of the element 10 as seen at 17 in said figure.

It will be understood that the inside diameter of the element 10 including the members 12 thereon, as well as the members 11 is less than the outside diameter of the pipe, rod or the like 16. If desired, rubber cement or other similar substance may be applied to the pipe 16 in the operation of inserting the same in proper position in the coupling to provide for an easier action or the exertion of less pressure in this operation, but the use of this liquid is not necessary.

The other pipe or member 18 to be connected with the coupling is indicated in dotted lines in Fig. 1 of the drawings, and this member is inserted in the same fashion and operates to flex the members 11 in the same manner as the flexing of the members 12. When both parts or tubes 16 and 18 are in proper position, they are retained against displacement from the coupling due to the flexure and compression of the members 11 and 12. At this time, it is to be understood that my invention is not necessarily limited to the specific structure or arrangement of the members 11 and 12 herein shown and described, in connection with the structure shown in Fig. 1 or in any of the other figures.

In Fig. 3 of the drawings, I have shown a modification of the structure shown in Fig. 1, wherein a coupling element 19 representing one half of the structure shown in Figs. 1 and 5 is employed, said element having a projecting flange 20 at one end adapted to engage one edge wall of a pipe or tube 21 to be coupled with another pipe, tube or rod 22 indicated in dotted lines in said figure. The element 19 is made in strip form the same as the element 10, and includes one set of inwardly projecting rib members 19a which are adapted to be flexed and placed under compression in the operation of inserting the part 22 into the part 21. The intersection of the ends of the element 19 is seen at 19b.

In Figs. 2 and 6 of the drawings, I have shown a modification of the structure shown in Figs. 1 and 5, wherein a coupling element 23 fashioned from a strip in the same manner as the formation of the element 10 is provided on its outer wall with two sets of projecting rib members 24 and 25. The inclined walls of these rib members, instead of being directed to the central portion of the coupling element are directed outwardly and oppositely to the side edges of said element. In this construction, the outwardly extending flanges 24a and 25a extend in the same direction as the members 24 and 25, and engage the end walls of the tubular coupling 26 as seen in Fig. 2 of the drawings.

In this construction, it will be understood that in inserting either one of the pipes, rods or the like 27—27a, the pipe 27 being shown in full lines and the pipe 27a in dotted lines, the inward movement of said pipes into the coupling and in engaging the inner walls of the element 23 will operate to place the members 24 and 25 under compression in the manner seen at the right of Fig. 2 of the drawings, it being understood that the inside diameter of the element 23 is less than the outside diameter of the pipes 27—27a. The exposed ends of the element 23 are preferably rounded adjacent the inside diameter to permit of the free insertion of the pipes 27 and 27a.

It will be understood that the movement of said pipes will advance the body of rubber employed in the element 23 to accomplish the result above stated. The intermediate section of the element 23 is slightly recessed as seen at 28 but is of a greater body in thickness than the sections of said element provided with the rods 24 and 25 to form a stop wall or body portion which will build up and resist to a degree further inward movement of either of the pipes 27—27a. The same result is accomplished in the structure shown in Figs. 1 and 5 by the enlarged central portion 10b.

In Fig. 4 of the drawings, I have shown at 29 a coupling element which constitutes one half of the element 23 shown in Figs. 2 and 6 of the drawings, which is used in substantially the same manner as the element 19 shown in Fig. 3 of the drawings. The element 29 has external rib members 29a engaging the inner wall of an enlarged portion 30 on one pipe 30a to be coupled with another pipe 31 indicated in dotted lines in said figure. The flange 29b of the element 29 engages the edge of the enlargement 30. It will be understood that the element 19 may be used in conjunction with a pipe structure such as seen in Fig. 4, and in like manner, the element 29 may be used in the manner seen in Fig. 3. In Fig. 4 of the drawings, the intersection of the ends of the strip from which the element 29 is formed is seen at 32.

In Fig. 7 of the drawings, I have shown a part of the coupling 10 shown in Fig. 1, and including a part of the sleeve 14 employed in securing two pipes or tubes 33 and 34 together, the only difference being that the pipes or tubes 33 and 34 have interlocking or overlapping portions. The pipe 33 has a re duced part 33a seating within a cut out portion or recess 34a in the pipe 34, thus forming an overlapped joint between the pipes 33 and 34 within the coupling formed by the element 10 or the tube or sleeve 14.

It will be understood that the several forms of couplings disclosed may be used for securing two pipes, rods or the like, or a pipe and a rod in piping of various kinds and classes or in tubular structures or frameworks and still further in rod structures or a combination of rod and tube structures for any desired use; and it will also be understood that my invention is not necessarily limited to any particular cross sectional form of the tubes or rods and the couplings employed in connection therewith. The mere fact that the same are shown circular in the present construction, does not necessarily limit my invention in this respect.

The distinctive feature of my invention resides in the provision of a coupling involving an element or body of rubber or other yielding material and a substantially rigid body or sleeve, and in some instances, this rigid body may constitute an integral part of one of the members to be coupled as illustrated in Figs. 3 and 4 of the drawings, and particularly to the formation of the yielding body or element from an elongated strip, and folding and coiling the body in its placement in the rigid body constituting a part of the coupling. It will be understood that various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. In a coupling of the class described, a coupling body of yielding material in the form of a strip having transversely spaced projecting rib members on one side face thereof, the ends of said strip being adapted to be brought together in forming a coupling body thereof, the rib members at one side portion of said body being inclined in a direction opposite to that of the rib members at the other side edge of said body, and the side edges of said body having projecting flanges, the outer surfaces of which are rounded.

2. In a coupling of the class described, a tubular coupling body of yielding material, one surface of said body having longitudinally spaced and circumferentially arranged rib members, the rib members at one side of said body being inclined in a direction opposite to the rib members at the other side thereof, a coupling sleeve in which said body is mounted, and the end portions of said body having outwardly extending flanges engaging the end walls of said coupling sleeve.

3. In a coupling of the class described, a tubular coupling body of yielding material, one surface of said body having longitudinally spaced and circumferentially arranged rib members, the rib members at one side of said body being inclined in a direction opposite to the rib members at the other side thereof, a coupling sleeve in which said body is mounted, the end portions of said body having outwardly extending flanges engaging the end walls of said coupling sleeve, and the central portion of said body being of slightly greater thickness than the thickness of the body intermediate the separate ribs.

4. A pipe coupling of the class described comprising a coupling sleeve, a split tubular body of yielding material mounted within said sleeve and constituting a lining therefor, the inside diameter of said body being less than the outside diameter of the pipes to be coupled therewith, and one surface of said tubular body having a plurality of longitudinally spaced projecting members inclined in opposite directions at the opposite sides thereof and adapted to be flexed and to be placed under compression in the insertion of pipes into the opposite ends of said coupling in the operation of coupling said pipes.

5. A pipe coupling of the class described comprising a coupling sleeve, a split tubular body of yielding material mounted within said sleeve and constituting a lining therefor, the inside diameter of said body being less than the outside diameter of the pipes to be coupled therewith and one surface of said tubular body having longitudinally spaced projecting members inclined in opposite directions at the opposite sides thereof and adapted to be flexed and to be placed under compression in the insertion of pipes into the opposite ends of said coupling in the operation of coupling said pipes, and said coupling body including outwardly projecting flanges adapted to engage the ends of said coupling sleeve.

6. A coupling for securing two parts together comprising an element composed of yielding material in the form of a flap strip, one surface of said strip having a plurality of longitudinally spaced and projecting members, said strip being adapted to be shaped to fit between adjacent walls of said parts to be coupled, and the projecting members on one surface of said element being adapted to be flexed and placed under compression in coupling said parts together.

7. A coupling for securing two parts together comprising an element composed of yielding material in the form of a flat strip, one surface of said strip having a plurality of longitudinally spaced and projecting members, said strip being adapted to be shaped to fit between adjacent walls of said parts to be coupled, the projecting members on one surface of said element being adapted to be flexed and placed under compression in coupling said parts together, and said element including a projecting flange at one end thereof adapted to engage one end wall of one of said parts.

In testimony that I claim the foregoing as my invention I have signed my name this 25th day of April, 1928.

HARRY E. SIPE.